United States Patent [19]

Steudel

[11] 4,124,852

[45] Nov. 7, 1978

[54] PHASED POWER SWITCHING SYSTEM FOR SCANNING ANTENNA ARRAY

[75] Inventor: Fritz Steudel, Sudbury, Mass.

[73] Assignee: Raytheon Company, Lexington, Mass.

[21] Appl. No.: 761,920

[22] Filed: Jan. 24, 1977

[51] Int. Cl.$^2$ .............................................. H01G 3/26

[52] U.S. Cl. ........................................ 343/854; 333/6

[58] Field of Search ....................... 343/853, 854, 876; 333/6

[56] References Cited

U.S. PATENT DOCUMENTS

| | | | |
|---|---|---|---|
| 3,255,450 | 6/1966 | Butler | 343/854 |
| 3,474,447 | 10/1969 | Melancon | 343/854 |
| 3,993,999 | 11/1976 | Hemmi et al. | 343/854 |
| 3,997,900 | 12/1976 | Chin et al. | 343/854 |

*Primary Examiner*—Eli Lieberman

*Attorney, Agent, or Firm*—David M. Warren; Milton D. Bartlett; Joseph D. Pannone

[57] ABSTRACT

A system for a phased array antenna including a set of power amplifiers for amplifying the power of a signal to be transmitted by radiating elements of the antenna. A set of hybrid couplers are connected between the power amplifiers and the radiating elements with individual ones of the hybrid couplers being cross-connected for sharing the power of each amplifier among a set of radiating elements. The coupling of power is selectively varied between the amplifiers and the radiating elements by shifting the phase of the signal applied to each power amplifier.

5 Claims, 6 Drawing Figures

| CASE | IN FACE | | $TWT_1$ | $TWT_2$ | TRANSMITTER MODULES 1 & 2 | | | | RELATIVE PHASES AT DISTRIB. NETWORKS | | | |
|---|---|---|---|---|---|---|---|---|---|---|---|---|
| | A | B | | | $\phi_1$ | $\phi_2$ | $\phi_3$ | $\phi_4$ | A1 | A2 | B1 | B2 |
| 1 | 1/2 | 1/2 | ON | ON | 0 | 0 | 0 | 0 | 0 | 0 | 0 | 0 |
| 2 | 1/4 | 1/4 | ON | OFF | 0 | – | 90 | – | 0 | 180 | 0 | 0 |
| 3 | 1/4 | 1/4 | OFF | ON | – | 0 | – | 90 | 0 | 0 | 0 | 180 |
| 4 | 1/2 | 0 | ON | OFF | 0 | – | 180 | – | 0 | 180 | – | – |
| 5 | 0 | 1/2 | ON | OFF | 0 | – | 0 | – | – | – | 0 | 0 |
| 6 | 1/2 | 0 | OFF | ON | – | 0 | – | 0 | 0 | 0 | – | – |
| 7 | 0 | 1/2 | OFF | ON | – | 0 | – | 180 | – | – | 0 | 180 |
| 8 | 1 | 0 | ON | ON | 0 | 180 | 180 | 180 | 90 | 0 | – | – |
| 9 | 0 | 1 | ON | ON | 0 | 180 | 0 | 0 | – | – | 0 | 90 |

PHASED POWER SWITCHING SYSTEM FOR SCANNING ANTENNA ARRAY

BACKGROUND OF THE INVENTION

Phased array antennas are sometimes utilized in the searching and the tracking of aircraft from a fixed site. The antennas are physically large requiring a building to support an antenna face. In a typical installation wherein such an antenna is located on the shore of the ocean for monitoring the aircraft flying over the ocean, two or more antenna faces may be employed with the faces being angled to each other to provide adequate azimuthal coverage of the air space. The use of many radiating elements with their respective phase shifters in each face permits the formation of a highly directive radiation pattern as well as the deployment of greater power than that of smaller antennas. The transmitters for such antennas may well employ a number of power amplifiers, such as klystrons or traveling wave tubes (TWT), which are operated in parallel to provide greater power to a transmitted signal than that which can be provided by only one power amplifier.

A problem arises in that it is frequently desirable to be able to direct the power selectively to one or another of the faces, to evenly distribute the power among the faces, to permit the sequential operation of groups of the power amplifiers for producing a longer duration radiated signal pulse of increased energy but within the duty cycle of the phase shifters, and to connect the power amplifiers to the radiating elements in a configuration wherein the loss of the use of a single power amplifier does not noticeably degrade the radiation pattern. The foregoing requirements necessitate a form of switching, but the switching of high power, such as the high power of a TWT, is not readily accomplished in a situation which requires the switching of power rapidly from one aircraft target to another in a multiple target tracking situation.

SUMMARY OF THE INVENTION

The foregoing problems are overcome and other advantages are provided by a system for a phased array antenna including a set of power amplifiers for amplifying the power of a signal to be transmitted by radiating elements of the antenna, wherein, in accordance with the invention, a set of hybrid couplers is employed for coupling signals from the power amplifiers to the radiating elements. Individual ones of the hybrid couplers are cross-connected whereby signals provided by the various power amplifiers are combined for distribution of the power of these signals among each of the radiating elements in a set of the radiating elements in one or more antenna faces of the phased array antenna. A phase shifter is coupled between a signal source and an input terminal of each power amplifier for varying the relative phases between input signals to the individual power amplifiers, this variation of phase being accomplished at signal power levels which are very low compared to the signal power levels produced at output terminals of the power amplifiers. The combination of the signals of the power amplifiers by the hybrid couplers is dependent upon the relative phases of these signals so that, in accordance with the invention, a switching of power from one set of radiating elements to another, or the switching of the power to provide a uniform distribution of power among the radiating elements, is accomplished by an appropriate selection of the relative phses of the signals applied to the input terminals of the power amplifiers.

BRIEF DESCRIPTION OF THE DRAWINGS

The aforementioned aspects and other features of the invention are explained in the following description taken in connection with the accompanying drawings wherein.

DESCRIPTION OF THE PREFERRED EMBODIMENT

Figures 1, 4:
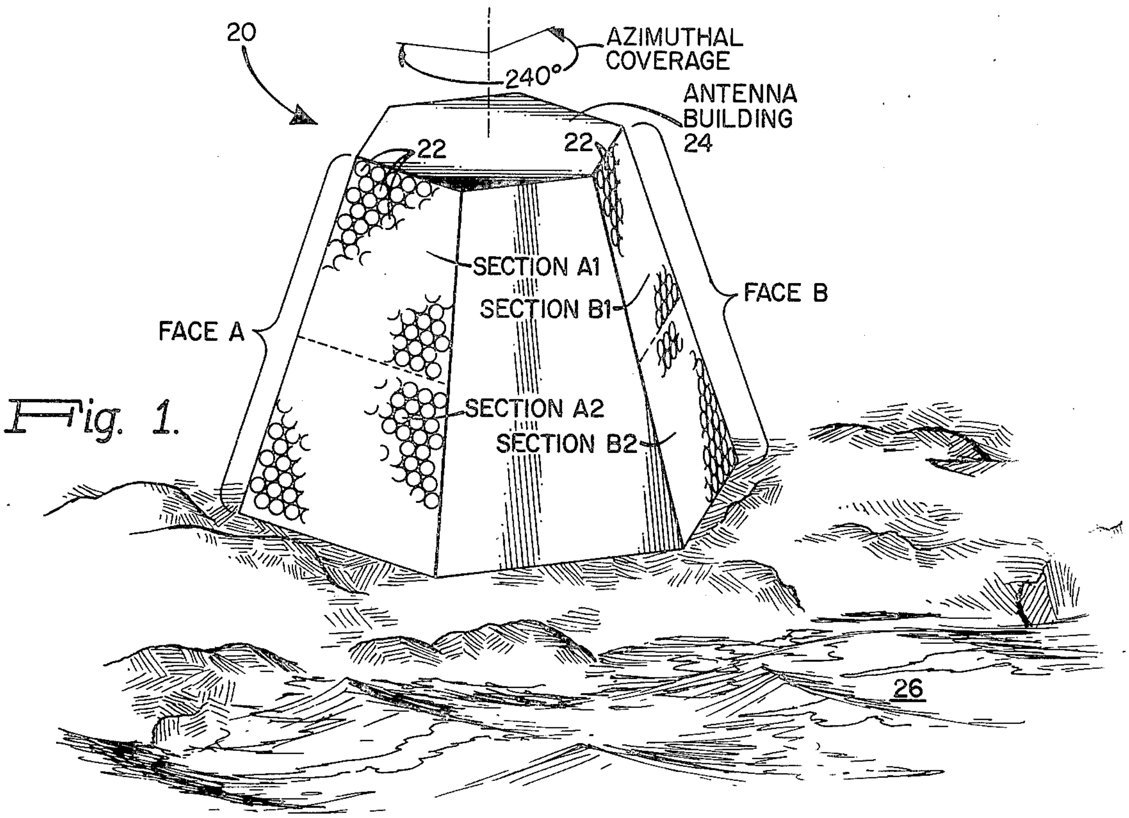
FIG. 1 shows an antenna for use with the system of the invention, the antenna being positioned on the shore of an ocean for tracking aircraft targets flying over the ocean, the antenna having two faces to provide sufficient azimuthal coverage of the targets.
FIG. 4 is a table of the distribution of the power among the various sections of the antenna face and the corresponding phase angles of the signals applied to the power amplifiers as well as the phases of the signals produced by the combination of signals by the hybrid couplers.

Referring to FIG. 1, there is seen a phased array antenna 20 having two faces, labeled A and B, comprising radiating elements 22 and inclined along the sides of a building 24 having a hexagonal base. The faces are at angles at 120° relative to each other, and each permits the steering of a beam radiated therefrom over an azimuthal sector of 120°, this giving a total of 240° azimuthal coverage for radiation from both of the faces. Face A is divided into two sections, the upper section being identified by the legend A1 while the lower section is identified by the legend A2. Similarly, Face B is divided into upper and lower sections, identified by the legends B1 and B2. The antenna 20 is erected on the shore of the ocean 26 to provide for the searching and tracking of aircraft targets flying over the ocean 26. The inclination of the Faces A and B in the vertical plane facilitates the scanning of the radar beam in elevation.

Figure 2:
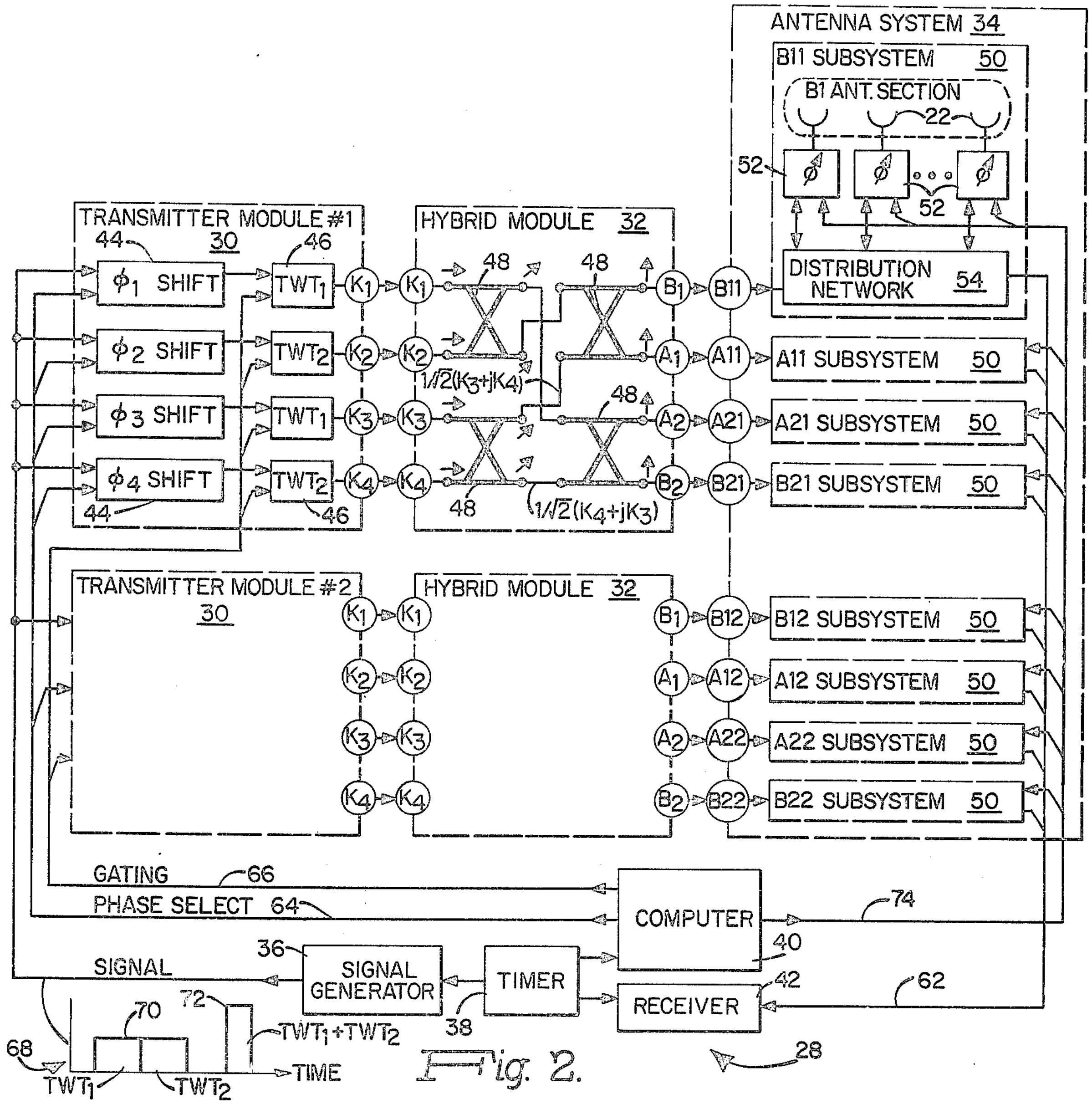
FIG. 2 is a block diagram, partially schematic, of a system, in accordance with the invention, which couples power from a plurality of amplifiers by cross-connected hybrid couplers to sets of radiating elements located in sections of the faces of the antenna of FIG. 1, FIG. 2 also having a timing diagram showing the generation of a transmitted signal having a relatively long pulse and low power by the sequential operation of power amplifiers, and the generation of a relatively narrow pulse of higher power by the simultaneous operation of all the power amplifiers.

Referring now to FIG. 2, there is seen a diagram of a system 28 for energizing the radiating elements 22 of the antenna 20 of FIG. 1, the system 28 including transmitter modules 30, hybrid modules 32, an antenna system 34 comprising the radiating elements 22 and their associated power distribution circuitry, a signal generator 36, a timer 38, a computer 40, and a receiver 42 which processes and displays signals reflected from the targets and received by the radiating elements 22.

Each transmitter module 30 comprises phase shifters 44 which are further identified by the legends $\phi_1$–$\phi_4$, and power amplifiers in the form of traveling wave tubes, hereinafter referred to as TWT's 46 of which alternate ones are further identified by the numerals 1 and 2. Each hybrid module 32 comprises four hybrid microwave couplers 48 each of which, in a preferred embodiment of the invention, is in a commercially available form having two side-arm waveguides coupled by two cross-arms wherein half the power from an input port propagates along a side-arm while the remaining power from the input port propagates along a cross-arm which also introduces a 90° phase shift to the signal propagating therethrough. The two couplers 48 on the left hand side of the modules 32 are shown with their input ports coupled respectively to the terminals K1–K4. With respect to the coupler 48 in the lower left hand corner of the hybrid module 32, mathematical legends appended to the signal lines of the output ports of the coupler 48 describe the output signals in terms of the input signals and are seen to contain the symbols K3 and K4 wherein it is understood that the symbols are to be taken as complex numbers having magnitude and phase and representing a magnitude and phase of the signals provided by the corresponding terminals K3 and K4.

The antenna system 34 is seen to comprise subsystems 50, further identified by the legends A11–A22 and B11–B22, wherein the subsystems A11 and A12 are understood to include radiating elements 22 of the section A1 of FIG. 1, the subsystems A21–A22 are understood to include radiating elements 22 of section A2 of FIG. 1, while the subsystems B11–B21 and B12–B22 include radiating elements 22 of the corresponding sections of Face B of FIG. 1. Each subsystem 50 includes phase shifters 52 coupled to individual ones of the radiating elements 22 and a distribution network 54 which, as will be described in FIG. 3, divides the power incident at its input port among each of the phase shifters 52 coupled thereto.

Figure 3:
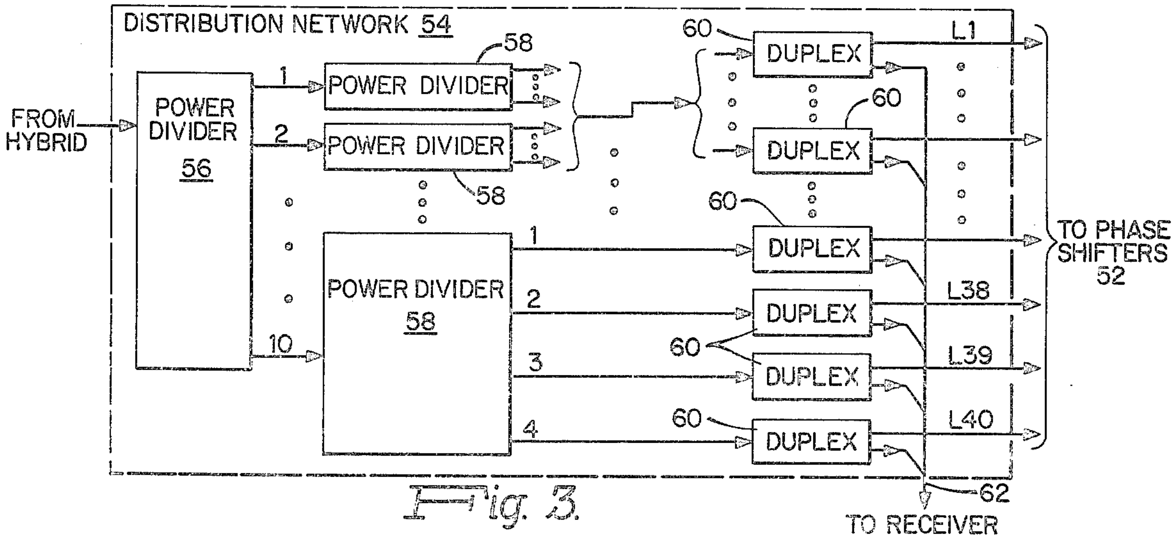
FIG. 3 shows a block diagram of a power distribution network of FIG. 2 for the distribution of power among the radiating elements in one of the aforementioned sections of an antenna face.

Referring now to FIG. 3, there is seen a diagram of a distribution network 54 of FIG. 2. The distribution network 54 is seen to comprise a power divider 56 which has one input port and 10 output ports for providing 1/10 of the input power in each of its output ports, power dividers 58 which are coupled to respective ones of the output ports of the power divider 56 and are similar to the power divider 56 but have only four output ports apiece, and duplexers 60 by which transmitted power is coupled from the power dividers 58 to the phase shifters 52 of FIG. 2 and by which echo signals from the targets coupled by the phase shifters 52 are directed along line 62 to the receiver 42 of FIG. 2.

Referring now to FIGS. 1–4, the operation of the system 28 is as follows. The timer 38 generates timing signals which are coupled to the signal generator 36, the computer 38 and the receiver 42 for synchronizing their respective operations. In response to signals of the timer 38, the generator 36 provides a signal to each of the phase shifters 44. Each of the phase shifters 44 imparts a phase shift to the signal of the generator 36 and couples the phase shifted signal to its corresponding TWT 46. The computer 40, in response to signals of the timers 38, provides phase selection signals along line 64, the line 64 being seen to fan out into each of the phase shifters 44 for coupling respective ones of the phase selection signals to corresponding ones of the phase shifters 44 whereby each phase shifter 44 is operated to impart a selected phase angle to the signal of the generator 36. The phse shifted signals are amplified by the respective TWT's 46 and then coupled by the terminals K1–K4 of the module 30 to the corresponding terminals of the module 32.

Various phase angles shown in FIG. 4, may be imparted by the phase shifters 44. By way of example, FIG. 2 shows a set of vectors inscribed adjacent the terminals of the couplers 48 in the hybrid module 32 to teach the operation of the interconnection of the couplers 48. In the example of FIG. 2, each of the phase shifters 44 is set to a value of 0°, and accordingly, the vectors along the lines coupling the terminals K1–K4 to the input ports of the couplers 48 are shown horizontal and pointing to the right, this being the convention employed when complex numbers are represented by a set of cartesian coordinates (not shown). In accordance with the mathematical formuation appended to the output ports of the coupler 48 in the lower left corner of the module 32, it is readily seen that the signals at the output ports of the two couplers 48 at the left hand side of the module 32 are represented by vectors oriented at 45°, these vectors being shown in the figure adjacent the output ports of these two couplers 48. The couplers 48 at the right hand side of the module 32 operate in the same manner as the aforementioned two couplers 48 with the result that the signals coupled from the output ports of the couplers 48 on the right hand side of the module 32 to the output terminals B1, A1, A2 and B2 of the module 32 are represented by vectors oriented at 90°. The cross connection of the couplers 48 wherein the coupler 48 of the upper right hand corner is connected between the lower right terminal and the upper right terminal respectively of the upper and lower couplers 48 of the left side of the module 32 and, similarly, the cross connection of the lower right coupler 48 with the remaining output ports of the left side couplers 48, as depicted in FIG. 2, provide for a steering or switching of microwave power as is summarized in the table of FIG. 4.

The first row of the table in FIG. 4 shows that with both TWT1 and TWT2 in the ON condition and with the phases $\phi_1$–$\phi_4$ of the shifters 44 being set to 0°, this being the example depicted by the vectors of FIG. 2, the total power provided by a transmitter module 30 is evenly divided between the Faces A and B of FIG. 1 with ½ the power being directed to Face A and ½ the power being directed to Face B. Also, since all of the vectors in FIG. 2 at the output terminals of the hybrid modules 32 are pointing in the same direction, there is no relative phase difference between any one of the four signals at the four output terminals A1, A2, B1 and B2 so that the first row of the table in FIG. 4 shows zero relative phase for each of these output terminals of the module 32. The next six rows of the tables, namely rows 2–7, depict situations wherein only half of the TWT's 46 are operating, so that only ½ of the total power is available either to be split evenly between the two Faces A and B or to be directed only to one of the two Faces A or B. Via line 66 which is seen to fan out into each of the TWT's 46 of FIG. 2, the computer 40 directs gating signals to gate respective ones of the TWT's 46 either ON or OFF.

With respect to the second case depicted in the second row of FIG. 4, TWT1 is ON while TWT2 is OFF, also $\phi_1$ is set equal to 0 and $\phi_3$ is set equal to 90° by the phase shifters 44. The phase settings of $\phi_2$ and $\phi_4$ are immaterial since there is no power transmitted through their corresponding TWT's 46. There results a uniform distribution of power at the four output terminals of the hybrid module 32; however, the phase of the signal at terminal A2 is at 180° relative to the phases of the signals of the other three terminals. Since the power is evenly distributed among the four output terminals of the module 32, but only half as much power is available due to the gating OFF of TWT2, one quarter of the total available power appears at Face A and one quarter of the total available power appears at Face B.

It is noted that FIG. 2 shows two transmitter modules 30 for a total of eight TWT's 46, the power of the second module 30 being directed to the subsystems 50 identified by the legends A12–22 and B12–22. The radiating elements 22 of the subsystems 50 may be interleaved so that half of the radiating elements 22 of Section A1 receive their power from the first transmitter module 30 while the other half of the radiating elements 22 of Section A1 receive their power from the second transmitter module 30. Similar comments apply to the other three sections of the antenna 20 of FIG. 1. In the event of a failure of one of the TWT's 46 of the first module 30 of FIG. 2, only those radiating elements 22 receiving their power from the first module 30 powered by the second transmitter module 30 would not experience the aforementioned reduction in power. By interleaving the radiating elements 22 which are powered by the first of the transmitter modules 30, with the elements 22 powered by the second of the modules 30, degradation of the radiation pattern of the antenna 20 is minimized.

A graph 68 in FIG. 2 shows two signal pulses 70 and 72, the pulse 70 being of relatively long duration and reduced amplitude as compared to the pulse 72. The signal pulse 72 represents a relatively short burst signal from the radiating elements 22 of the antenna 20, the short burst signal being produced by the signal generator 36 with each of the TWT's 46 being simultaneously energized. The signal pulse 70 represents a relatively long duration signal of reduced amplitude radiated by the radiating elements 22 of the antenna 20, the relatively long duration signal being produced by the signal generator 36 with groups of the TWT's 46 being energized sequentially. The sequential operation of the groups of the TWT's 46 provides for a reduced peak power upon the phase shifters 52 coupled to each of the radiating elements 22 and thus permits the radiation of a relatively long duration signal with a relatively high energy content by the antenna 20. In the preferred embodiment of the invention, two groups of TWT's 46 are utilized, one group comprising the TWT's 46 identified by the numeral 1 in FIG. 2, while the second group comprises the TWT's 46 identified by the numeral 2, as shown in FIG. 2. As shown in the graph 68, the first group of TWT's 46 is utilized during the first half of the pulse 70, while the second group of TWT's 46 is utilized during the second half of the pulse 70, the gating signals for selectivity energizing the two groups of TWT's 46 being provided along the line 66 from the computer 40.

With reference to FIG. 4, the first line of the table corresponds to the transmission of a pulse signal such as that represented by the pulse 72 of the graph 68 of FIG. 2. The lines 2–3 of FIG. 4 correspond respectively to the generation of the first and second halves of the signal pulse 70 shown on graph 68. Since only one half of the TWT's 46, this being the first group thereof, are energized, only one half the total power is being radiated at any instant of time and this power is divided equally between the Faces A and B of the antenna 20 of FIG. 1. Similarly, the third line of FIG. 4 shows that one quarter of the power is radiated by Face A, one quarter of the power is radiated by Face B, the first group of TWT's 46 is gated OFF, the second group of TWT's 46 is gated ON, and that the shifters 44 producing the phase angles $\phi_2$ and $\phi_4$ in each of the modules 30 produce respectively 0° and 90° for a resultant uniform distribution of power from the four sections of the antenna 20 of FIG. 1. The last four entries in the third line show that the phases of the signals applied to the subsystems 50 of the antenna system 34 are in phase except for the signal coupled via the terminal B2 which is shifted in phase by 180° relative to the phases of the signals of the other three sections. No entry appears under $\phi_1$ and $\phi_3$ since the corresponding phase shifters 44 are coupled to the first group of TWT's 46 which is gated OFF.

The lines 4–7 of FIG. 4 show further modes of operation of the system 28 of FIG. 2 wherein only one group of TWT's 46 is energized at a time and wherein the power produced by that energized group of TWT's 46 is directed to only one face of the antenna 20 of FIG. 1, the switching of power to either Face A or Face B being accomplished simply by a selective energization of the groups of TWT's 46 and the application of either 0° or 180° phase shift, as set forth in FIG. 4, by the phase shifters 44. Thus, for example, Line 4 shows the situation in which only one half of the TWT's 46 are energized at a given instant of time and wherein all of the power produced by those energized TWT's 46 is directed to Face A with no power being directed to Face B. The last two entries in Line 4 show that no power is directed to the antenna sections B1 and B2 while the signals radiated from the radiating elements 22 of the antenna section A2 are shifted 180° in phase with the signals radiated from the radiating elements 22 of the antenna section A1.

The computer 40 of FIG. 2 provides control signals on line 74 to the phase shifters 52, the line 74 being seen to fan into each of the phase shifters 52 in each of the subsystems 50 for individually operating the phase shifters 52 to impart phase shifts to signals radiated from and received by individual radiating elements 22. In accordance with the control signals on line 74, the phase shifters 52 form and steer beams of transmitted radiation and beams of received radiation. In addition, the signals on line 74 include phase shift orders which compensate for the relative phase shifts shown in the last four columns of FIG. 4 so that the beams of radiation produced by the array of radiating elements 22 are independent of the relative phase shifts between the signals at the output terminals of the hybrid modules 32.

The eighth and ninth lines of FIG. 4 treat the cases wherein a pulse signal such as the short duration pulse 72 of the graph 68, is to be transmitted with all of the power being radiated from either Face A or Face B. Thus, both groups of TWT's 46 are simultaneously gated ON with either Face A or Face B receiving the power as switched thereto by the hybrid modules 32 in accordance with phase angles $\phi_1$, $\phi_2$, $\phi_3$ and $\phi_4$ imparted by the phase shifters 44 as shown in the eighth and ninth lines of FIG. 4. As seen in the four right hand columns of FIG. 4, when the power has radiated from Face A, the antenna sections A1 and A2 receive signals which differ in phase by 90°. Similarly, when the power is radiated from Face B, the antenna sections B1 and B2 receive signals which differ in phase by 90°. These differences in phase are compensated for by the phase shift command signals transmitted along the line 74 to the individual phase shifters 52 of FIG. 2.

Figure 5:
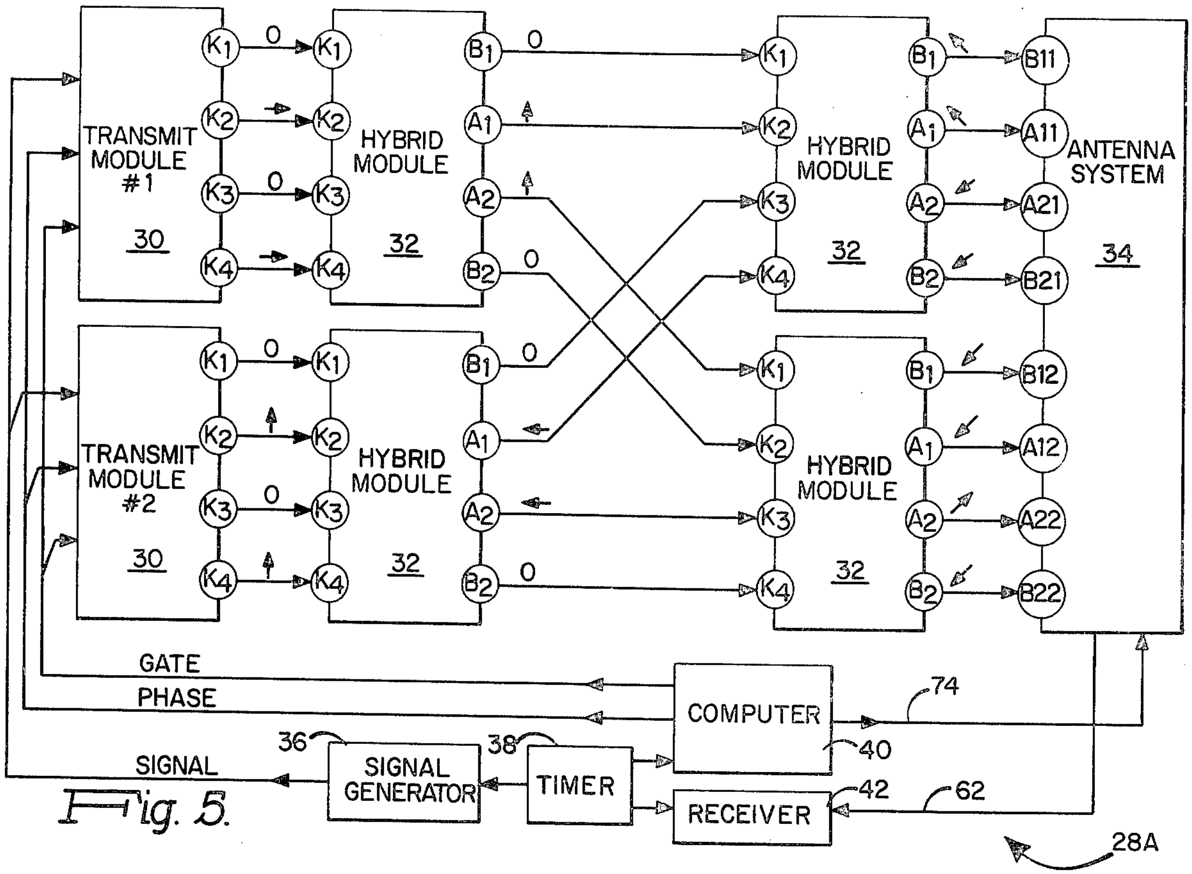
FIG. 5 is a block diagram showing the interconnection of a pair of transmitter modules of FIG. 2 with a plurality of hybrid coupling modules of FIG. 2 for the sharing of the power of each of the power amplifiers in the two transmitting modules among the radiating elements in the various sections of the antenna of FIG. 1, FIG. 5 also showing vectorially, the phase angles of signals on the lines interconnecting the hybrid coupling modules with each other and the other elements of the system.

Referring now to FIG. 5, there is seen an alternative embodiment of the system 28 of FIG. 2, this alternative embodiment being identified by the legend 28A. The system 28A is similar to the system 28 but further includes an extra pair of hybrid modules 32 for demonstrating an embodiment of the invention wherein the power from all eight TWT's 46 is shared among each of the radiating elements 22 of the antenna system 34. The four hybrid modules 32 are interconnected as shown in FIG. 5 with the terminals B1 and A1 of the upper left module 32 being directly connected to the terminals K1 and K2, while the terminals A2 and B2 of the lower left module 32 are coupled to the terminals K3 and K4 of the lower right module 32. The other terminals are cross-coupled between the two pairs of modules 32, terminals A2 and B2 of the upper left module 32 being cross-coupled to the terminals K1 and K2 of the lower right module and, similarly, the terminals B1 and A1 of the lower left module 32 being cross-coupled to the terminals K3 and K4 of the upper right module 32. Vectors are appended to the lines connecting signals to and from the modules 32 for showing the relative phases of the signals on these lines in a manner analogous to that shown for the signals of the hybrid module 32 in FIG. 2. The case portrayed by the vectors in FIG. 5 are analogous to the third line of FIG. 4 wherein no signal is transmitted by the TWT's 46 of the first group in the transmitting modules 30, and wherein the phase shifters 44 provide values of $\phi_2$ and $\phi_4$ equal to both 0° and 90°. The resultant power is evenly distributed among each of the input terminals to the antenna system 34 with phase differences between the signals of the various input terminals being shown as portrayed by the vectors of FIG. 5. It is noted that the signals directed towards Face B of the antenna differ by 90° from the signals applied to Face A of the antenna, this being a different phase relationship than that shown in line 3 of FIG. 4 for the system 28 of FIG. 2. Thereby, the system 28A is able to transmit a long pulse signal such as the pulse 70 of FIG. 2 with substantial immunity to the failure of a single TWT 46 since the power from each TWT 46 which is gated ON, whether this be of a TWT 46 of group 1 or of group 2, is coupled to each of the radiating elements 72 of the antenna 20.

Figure 6:
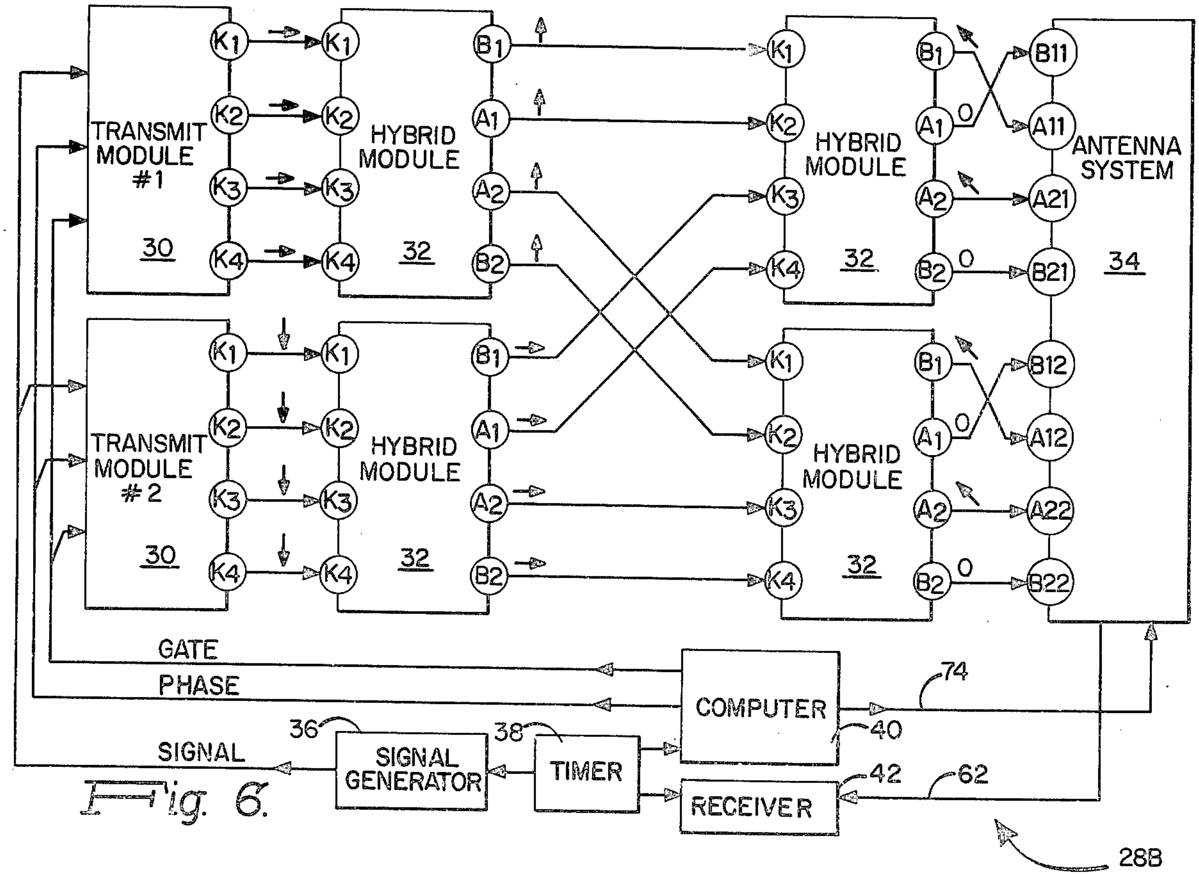
FIG. 6 is a diagram, similar to that of FIG. 5, but showing a reversal of connection between certain terminals of the hybrid coupling modules and specific sections of the antenna which permits the switching of all the power to one face of the antenna.

Referring now to FIG. 6, there is shown an alternative embodiment of the system 28 of FIG. 2, this system being identified by the legend 28B. FIG. 6 is identical to FIG. 5 except for the cross connections between terminal B1 and A1 of the upper right hybrid module 32 and the terminals B11 and A11 of the antenna system 34, the corresponding terminals B1 and A1 of the lower right module 32 being similarly cross-coupled to the terminals B12 and A12 of the antenna system 34. FIG. 6 differs from FIG. 5 in that the vectors appended adjacent the lines coupling the signals to and from the hybrid modules 32 demonstrate the cases of the last two lines of FIG. 4 wherein both groups of TWT's 46 simultaneously are gated ON and wherein all of the power produced therefrom is directed to one of the faces of the antenna 20 of FIG. 1, FIG. 6 showing the case wherein the power is directed to Face A. The system 28B may also be utilized for case 3 of FIG. 4 in a manner analogous to that of the system 28A in which case the phase angles of signals directed to one part of a face would differ from the phase angles of signals directed to another part of that face. However, the computer 40 of FIG. 2 provides, as noted hereinabove, control signals on line 74 which order phase shifts of the phase shifters 52 which compensate for these differences in phase between the signals incident upon the various portions of the antenna system 34. Accordingly, it is seen that a plurality of hybrid modules 32 may be interconnected to permit the concurrent or sequential operation of groups of traveling wave tubes for selectively energizing either a portion or all of the antenna 20 of FIG. 1, the selected direction being controlled solely by the use of phase shifting of input signals through the traveling wave tubes and the passive operation of hybrid couplers in the hybrid modules 32.

It is understood that the above described embodiments of the invention are illustrative only and that modifications thereof may occur to those skilled in the art. Accordingly, it is desired that this invention is not to be limited to the embodiments disclosed herein but is to be limited only as defined by the appended claims.

What is claimed is:

1. A switching system for coupling a signal to a plurality of terminals, said system comprising:

a plurality of hybrid couplers each of which has a plurality of input ports and a plurality of output ports, first means for applying a signal to the first input port of said first coupler and the first input port of said second coupler, second means for applying said signal to the second output port of said first coupler and the second input port of said second coupler;

first phase shifting means for shifting the phase between the first and the second input ports of said first coupler in increments of 180°, second phase shifting means for shifting the phase between the first and the second input ports of said second coupler in increments of 90°;

means for activating said first and said second signal applying means and said first and said second phase shifting means; and wherein the first and the second input ports of a fourth of said couplers are coupled respectively between a first output port of said first coupler and a second output port of said second coupler, and the first and second phases ports of a third of said couplers are coupled respectively between a second output port of said first coupler and a first output port of said second coupler, the output ports of said third and said fourth couplers being coupled to said terminals.

2. A system according to claim 1 wherein said first and said second signal applying means includes means for varying the amplitude of a signal applied to a first input port relative to the signal applied to a second input port of one of said couplers.

3. A system for distributing a plurality of signals among a plurality of terminals, said system comprising:

a set of four hybrid modules each of which has four input ports and four output ports, each of said hybrid modules comprising a first, a second, a third and a fourth hybrid coupler, the input ports of a first and a second of said hybrid modules receiving said signals, the output ports of a third and a fourth of said hybrid modules being coupled to said terminals, a first pair of output ports from one of said couplers and a second pair of output ports from a second of said couplers of said first hybrid module being coupled to a first pair of input ports of one of said couplers respectively of said third and said fourth hybrid modules, a first pair of output ports from one of said couplers and a second pair of output ports from a second of said couplers of said second hybrid module being coupled to a second pair of input ports of one of said couplers respectively of said third and said fourth hybrid modules; and wherein a first output port of said first and of said second hybrid couplers in each of said modules being connected respectively to a first input port of said fourth hybrid coupler and to a second input port of said third hybrid coupler, a second output port of said first and of said second hybrid couplers being connected respectively to a first input port of said third hybrid coupler and to a second input port of said fourth hybrid coupler.

4. A system for coupling signals from a set of transmitters to a set of antenna elements comprising:

a set of four hybrid modules each of which has four input ports and four output ports, the input ports of a first and a second of said hybrid modules being coupled respectively to individual ones of said transmitters, the output ports of a third and a fourth of said hybrid modules being coupled respectively to individual ones of said antenna elements, a first pair and a second pair of output ports of said first hybrid module being coupled to a first pair of input ports respectively of said third and said fourth hybrid modules, a first pair and a second pair of output ports of said second hybrid module being coupled to a second pair of input ports respectively of said third and said fourth hybrid modules;

a set of phase shifters for shifting the signal of one transmitter relative to the signal of a second transmitter, each of said phase shifters shifting phase in increments of 90°; and wherein each of said hybrid modules comprises a first, a second, a third and a fourth hybrid coupler, a first output port of said first and of said second hybrid couplers being connected respectively to a first input port of said fourth hybrid coupler and to a second input port of said third hybrid coupler, a second output port of said first and of said second hybrid couplers being connected respectively to a first input port of said third hybrid coupler and to a second input port of said fourth hybrid coupler.

5. A system according to claim 4 further comprising means coupled to said set of transmitters for varying the amplitude of a signal transmitted by one of said transmitters relative to the signal transmitted by a second of said transmitters.

* * * * *